3,520,585
IMAGE OR CHARACTER RECOGNITION BY HOLOGRAPHIC TECHNIQUES

John Yarnell, St. Albans, England, assignor to Hawker Siddeley Dynamics Limited, Hatfield, England
No Drawing. Filed July 21, 1967, Ser. No. 654,966
Claims priority, application Great Britain, July 21, 1966, 32,904/66
Int. Cl. G02b
U.S. Cl. 350—3.5                                    8 Claims

ABSTRACT OF THE DISCLOSURE

This invention is an improved system for character recognition by complex spatial filtering. Matched filters are holographically prepared, either simultaneously or successively, with the particular subject to which the filter is to be matched recorded in one exposure, while competing subjects are recorded in other exposures, with different time-phase relationships in the interfering beams used in recording the competing subjects from the ones used in recording the particular subject. The filter will reject to a certain degree the different competing subjects, whose exposure times are calculated in accordance with the maximum value of the cross-correlation of said competing subjects with the particular subject in a manner such as to result in a high degree of rejection of the competing patterns.

---

This invention relates to holographic techniques, and especially to the recognition of images or characters thereby.

A matched filter for a particular subject can be formed by holographic technique and placed in a plane where there is thrown on to it a diffraction pattern from another subject. If the proper relationships are preserved between the matched filter and the image constituting the diffraction pattern, a lens downstream of said plane can be arranged to produce a light intensity distribution which is the cross correlation function of the two subjects. Or if the second subject should be the same as the first then the auto-correlation function will be produced. Therefore, a subject which is one of a number of known subjects may be recognised by throwing its diffraction pattern simultaneously or successively on to a matched filter for each of said known subjects and recognising which of the distribution functions derived is the auto-correlation function.

In order to achieve improved discrimination between the auto-correlation and cross-correlation functions, the hologram constituting the matched filter for any known subject is, according to the present invention, modified in manufacture by means of information relating to the other known subjects in such manner as to cause the filter to reject at least in some degree said other subjects.

Having thus been introduced in broad principle, the development according to the invention will now be explained in more detail.

A system of pattern recognition has been described by Vander Lugt (Vander Lugt, A. "Signal Detection by Complex Spatial Filtering." I.E.E.E. Transactions on Information Theory IT-10, 139, 1964) and others in which coherent light passing through an optical system is caused to come to a focal point in a plane containing a matched filter. An object P, for example a transparency, placed in the path of the light on its way to the focal point F produces a diffraction pattern in the plane containing F. It has been shown that a matched filter for an object R can be made from a hologram of R, made by photographic or other means, in which phase information regarding the incident light is preserved by the use of a reference beam coherent with the illumination forming the hologram and arriving simultaneously at the photographic plate. Such a hologram may be used as a matched filter for the object R; that is to say that a diffraction pattern from R thrown as described above on to the matched filter in the proper geometric relationship can be made, by the use of a lens downstream of this point, to produce an intensity distribution which is the auto-correlation function of R with itself. Similarly if the diffracting object is another pattern P the intensity distribution so produced will be the cross-correlation function of P and R.

The object in the present case is to provide a means of improving the matched filter in its ability to discriminate between the RR auto-correlation and any PR cross-correlation or correlations. For example, it is desirable in using such a machine to recognise characters in an alphabet that the maximum discrimination shall be exercised between the pattern R and similar patterns and this may be done as follows. In making the matched filter by the holographic technique mentioned above, information concerning the pattern R is impressed on the hologram recording plate in the way described. Also, competing patterns are used to modify the hologram. This can be done by earlier or later, successive or simultaneous exposures of the recording plate while the hologram-making apparatus is supplied with the competing patterns P. In the case of each of these competing patterns the time-phase relationship between the reference beam and the illuminating beam is changed as compared with the relationship existing when the hologram of R is being imprinted. Also the exposure time or intensity is controlled. In this way a filter is manufactured which as well as accepting an input pattern R will reject to a controlled degree each of the competing patterns P.

In one desirable apportionment of the degree of rejection between the individual competing patterns the exposure for each pattern P is related to the maximum value of the cross-correlation of each pattern P with R. The values of these cross-correlations may be obtained by calculation if the pattern is sufficiently simple, or by a direct experimental obscuration technique or by using an unmodified matched filter R in the pattern recognition machine while each pattern P is placed at the input of the machine. A measurement of the peak brightness of the cross-correlation pattern so formed would be a suitable measure of the cross-correlation peak value required.

During the manufacture of this hologram it is desirable that no part of the recording plate shall be over-exposed or under-exposed, i.e., that the value of the illumination regarded as the sum of the intensities existing during all the imprinting operations, at any point of the plate, shall not take the active medium beyond its linear range. With this requirement in mind and with the proportioning of the filter prescribed as above, a filter may be manufactured which, while employing to the full the properties of the recording plate, contains information regarding not only the pattern to be accepted but those to be rejected and in this way discrimination against competing patterns is enhanced.

There will now be described a method of producing a holographic filter having the property such that it will, when used after the manner of Vander Lugt, produce a finite signal if presented with one pattern of a known set, and substantially zero signal if presented with any other pattern of that set.

Suppose, for example, we want a filter $p'$ to respond to the pattern P but not to B or R, and let us be restricted to those filters which can be made using these patterns as raw material, i.e., let $p'=p-\lambda_R r-\lambda_B b$ while small letters denote fillers matched to the patterns represented by capital letters. Denote the response of a filter $y$ to a pattern X by $y*X$.

Then for a linear device, $$p'*P = p*P - \lambda_R r*P - \lambda_B b*P$$
$$p'*R = p*R - \lambda_R r*R - \lambda_B bR$$
$$p'*B = p*B - \lambda_R r*B - \lambda_B b*B \quad (1)$$

We wish to minimise the last two responses and in fact they can be simultaneously made zero if $$\frac{\lambda_R}{\begin{vmatrix} p*Rb*R \\ p*Bb*B \end{vmatrix}} = \frac{\lambda_B}{\begin{vmatrix} p*Rr*R \\ p*Br*B \end{vmatrix}} = \frac{1}{\begin{vmatrix} r*Rb*R \\ r*Bb*B \end{vmatrix}}$$

The elements in the determinants are in fact correlation coefficients and for purely black and white patterns they are necessarily real and non-negative. They can be found unambiguously from measurements using unmodified matched filters (since $x*y=y*X$, ets., some combinations need not be measured except for checking). Alternatively they may be calculated, or they may be measured by directly observing the total light transmission through superimposed pairs of plates carrying transparencies of P, R and B. Having thus established the values of $\lambda_R$ and $\lambda_B$, which may be either sign, we proceed to manufacture a modified holographic filter, $p'$, as follows.

(1) Prefog a suitable photographic plate (or possibly film, hereafter the word "plate" refers to either) to a degree which brings the working point just onto the range where the developed transmissivity is a linear function of the integrated incident intensity, e.g., onto the linear part of the density:log exposure curve if the developed $\lambda$ will be 2.

(2) Mount the plate in an optical assembly adapted to the manufacture of Fourier-transform holograms, and employing a separately accessible reference beam.

(3) Expose the plate for a suitable time T as if to make a matched filter for P.

(4) Give the plate a second exposure, $\lambda_R$ times as great as in (3), as if to make a matched filter for R. If $\lambda_R$ is negative, alter by 180° the relative phases of the reference beam and that illuminating the input pattern R.

(5) Give the plate yet another exposure, $\lambda_B$ times as great as in (3), as if to make a matched filter for B, again changing the relative phases of illuminating and reference beams, if necessary, as in (4).

(6) Develop the plate to satisfy the conditions described in (1) above. In all the total exposure is not to take the plate beyond the sensibly linear part of the appropriate curve.

It is clear that the procedure described above for a class of three members can be extended to classes of any size.

In the simplest kind of holographic matched filter, as described by Vander Lugt, the discrimination is made on the peak brightness of what are in fact cross-correlation functions, e.g., the peak brightnesses of P*R and P*P are compared. If the pattern R is quite similar to P, as in the case of certain alphabetical patterns, these peak brightnesses differ only by a small amount. The present method in a sense removes what is common from the various cross-correlation functions, but more than that, it does so selectively so that only one (the cross-correlation P*P') has a finite brightness at its centre. (P' is the amplitude distribution, or pattern, which could be holographically reconstructed from $p'$).

In more refined types of filtering, e.g., Lowenthal's method (S. Lowenthal et al. Comptes Rendus de l'Academie des Sciences, p. 413, Feb. 17, 1965), the discrimination is improved by additional frequency-selective filtering in the Fourier plane, i.e., the plane of the hologram. By this means it can be arranged that we compare the cross-correlations not of the original patterns, but of modified varsions, such as patterns with density gradients enhanced. Such methods improve discrimination, but cannot remove all ambiguity. For example a letter N will correlate quite well with a letter H, and a letter I, with many capital letters, even when Lowenthal filtering has enhanced the edges. The present method, however, gives substantially zero signal for all patterns of a known set except the input pattern itself.

I claim:

1. An optical method of recognition of images or characters that constitute a set of known different subjects, comprising preparing by holographic technique a different matched filter for each of said known subjects, projecting on to each of said matched filters the diffraction pattern of each subject to be recognized to obtain a set of light-intensity distributions corresponding one to each filter, and determining which of the light-intensity distributions so obtained is the auto-correlation function of the subject with itself, and wherein the preparation of at least one of the matched filters includes the steps of holographically recording in a filter body, by means of an illuminating beam carrying the subject information and a reference beam, a representation of the subject in respect of which the filter is matched, and similarly recording in the same filter body but with a different time-phase relationship between the reference beam and the illuminating beam at least one further representation of a different competing one of the subjects in the set, whereby the completed filter displays a degree of rejection in respect of said competing subject.

2. A method according to claim 1, wherein the filter body employed is a photographic plate which is subjected to plural exposures in a hologram-making apparatus supplied both with the subject to which the filter is to be matched and with competing subjects which are to be rejected, the time-phase relationship between the reference beam and the illuminating beam being different for each exposure.

3. A method according to claim 2, wherein the plural exposures are made simultaneously.

4. A method according to claim 2, wherein the plural exposures are made in succession.

5. A method according to claim 2, wherein the exposures in respect of the competing subjects to be rejected are for different time periods each determined from the peak value of the cross-correlation function of the respective competing subject with the subject to be matched.

6. A method according to claim 1, wherein the total amount of the illumination applied during all the imprinting exposures, at any point of the plate, does not reach a value that would take the active photographic medium of the plate beyond the sensibly linear part of the transmissivity/exposure curve thereof.

7. A method according to claim 6, wherein the preparation of the matched filter comprises the steps of prefogging the plate, mounting the plate in an optical assembly arranged for making Fourier-transform holograms, exposing the plate for a selected time employing the subject to be matched, exposing the plate for further time periods employing in turn each of the competing subject to be rejected said further time periods being each equal to said selected time multiplied by a factor of multiplication determined similarly for each respective competing subject in accordance with the cross-correlation function of that competing subject and the subject to be matched, the time-phase relationship of the illuminated and reference beams being changed between successive exposures, and finally developing the plate.

8. A method according to claim 7, wherein during the further exposures the relative phase of the reference beam and that illuminating the subject is altered by 180° whenever a change in sign of the applicable factor of multiplication, as between one exposure and the next, occurs.

References Cited

Vander Lugt: IEEE Transactions on Information Theory, vol. IT–10 pp. 139–145 (March 1964).

Gabor et al.: Physics Letters, vol. 18, No. 2, pp. 116–118 (August 1965).

DAVID SCHONBERG, Primary Examiner

R. L. SHERMAN, Assistant Examiner

U.S. Cl. X.R.

350—162

Notice of Adverse Decision in Interference

In Interference No. 98,250, involving Patent No. 3,520,585, J. Yarnell, IMAGE OR CHARACTER RECOGNITION BY HALOGRAPHIC TECHNIQUES, final judgment adverse to the patentee was rendered May 1, 1974, as to claims 1, 2, 3 and 4.

[*Official Gazette of September 24, 1974.*]